(12) United States Patent
Chou et al.

(10) Patent No.: US 7,457,923 B1
(45) Date of Patent: Nov. 25, 2008

(54) METHOD AND STRUCTURE FOR CORRELATION-BASED PREFETCHING

(75) Inventors: Yuan C. Chou, Mountain View, CA (US); Wei Chung Hsu, Vadnais Heights, MN (US)

(73) Assignee: Sun Microsystems, Inc., Santa Clara, CA (US)

( * ) Notice: Subject to any disclaimer, the term of this patent is extended or adjusted under 35 U.S.C. 154(b) by 188 days.

(21) Appl. No.: 11/128,055

(22) Filed: May 11, 2005

(51) Int. Cl.
*G06F 12/00* (2006.01)
(52) U.S. Cl. ...................................... 711/137
(58) Field of Classification Search .................. 711/137
See application file for complete search history.

(56) References Cited

U.S. PATENT DOCUMENTS

| | | | | |
|---|---|---|---|---|
| 5,761,718 A | * | 6/1998 | Lin et al. | 711/137 |
| 5,778,436 A | * | 7/1998 | Kedem et al. | 711/137 |
| 5,802,566 A | * | 9/1998 | Hagersten | 711/137 |
| 6,047,363 A | * | 4/2000 | Lewchuk | 711/213 |
| 6,157,993 A | * | 12/2000 | Lewchuk | 711/213 |
| 6,609,168 B1 | * | 8/2003 | Willke, II | 710/110 |
| 6,687,794 B2 | * | 2/2004 | Malik | 711/137 |

OTHER PUBLICATIONS

IBM Technical Disclosure Bulletin NA82081286, Aug. 1, 1982, "Cache Miss Director—A Means of Prefetching Cache Missed Lines".*
IBM Technical Disclosure Bulletin NN931069, Oct. 1, 1993, "Tying Data Prefetching to Branch Prediction".*
Predicting Data Cache Misses in Non-Numeric Applications Through Correlation Profiling, by Todd Mowry and Chi-Keung Luk, Carnegie Mellon School of Computer Science, CMU-CS-97-175, Sep. 1997. http://reports-archive.adm.cs.cmu.edu/anon/1997/abstracts/97-175.html.*
Real-Time Microprocessor Systems, by Stephen R. Savitzky, van Nostrand Reinhold, 1985, pp. 239-247.*

* cited by examiner

*Primary Examiner*—Matt Kim
*Assistant Examiner*—John P Fishburn
(74) *Attorney, Agent, or Firm*—Gunnison, McKay & Hodgson, L.L.P.; Forrest Gunnison

(57) ABSTRACT

A dynamic prediction is made whether a load instruction will miss a cache. Data is prefetched for the load instruction when a cache miss is predicted. Thus, the prefetch is only performed if a trigger event correlated with a cache miss for that load instruction is detected. This selective execution of the prefetches for a particular load instruction improves processor utilization and performance.

6 Claims, 16 Drawing Sheets

METHOD AND STRUCTURE FOR CORRELATION-BASED PREFETCHING

BACKGROUND OF THE INVENTION

1. Field of the Invention

The present invention relates generally to enhancing performance of processors, and more particularly to methods for enhancing memory-level parallelism (MLP) and tolerating latency to reduce the overall time the processor spends waiting for data to be loaded.

2. Description of Related Art

To enhance the performance of modern processors, various techniques are used to enhance the number of instructions executed in a given time period. One of these techniques is prefetching data that the processor needs in the future.

Prefetching data, in general, refers to mechanisms that predict data that will be needed in the near future and issuing transactions to bring that data as close to the processor as possible. Bringing data closer to the processor reduces the latency to access that data when, and if, the data is needed.

Many forms of data prefetching have been proposed to increase memory-level parallelism (MLP). One form of data prefetching uses hardware mechanisms that prefetch data based on various heuristics. Another form of data prefetching uses traditional software prefetches where prefetch instructions are inserted in the instruction stream to initiate the data prefetching.

Most instruction set architectures have a prefetch instruction that lets the software inform the hardware that the software is likely to need data at a given location, specified in the instruction, in the near future. Hardware then responds to these prefetch instructions by potentially moving data to close caches in the processor.

To use prefetch instructions, software must also include code sequences to compute addresses. These code sequences add an overhead to the overall execution of the program as well as requiring the allocation of some hardware resources, such as registers, to be dedicated to the prefetch work for periods of time. The potential benefit of data prefetching to reduce the time the processor spends waiting for data can compensate for the overhead of data prefetching, but not always. This is especially complicated because software has at best imperfect knowledge ahead of time of what data will already be close to the processor and what data needs to be prefetched. For dynamic instances of a load that does not miss the cache, the overhead associated with the prefetch instruction likely degrades performance.

SUMMARY OF THE INVENTION

According to one embodiment of the present invention, a dynamic prediction is made whether a load instruction will miss a cache. Data is prefetched for the load instruction when a cache miss is predicted. Thus, the prefetch is only performed if a trigger event correlated with a cache miss for that load instruction is detected. This selective execution of the prefetches for a particular load instruction results in better processor utilization and performance than the prior art methods that typically prefetched data for every static occurrence of the load instruction.

In one embodiment, a computer-based method first determines whether a triggering event correlated with a cache miss for a load instruction occurred. Data is prefetched for the load instruction following the determining operation finding that the triggering event occurred. Otherwise, the prefetch is not performed.

In one embodiment, the triggering event is a correlated cache miss event. In another embodiment, the triggering event is a correlated control flow event. In still yet another embodiment, the triggering event is a correlated value event. In other embodiments, the triggering event is a combination of two or more of these events.

A structure includes means for determining whether a triggering event correlated with a cache miss for a load instruction occurred; and means for prefetching data for the load instruction following the means for determining finding that the triggering event occurred.

These means can be implemented, for example, by using stored computer executable instructions and a processor in a computer system to execute these instructions. The computer system can be a workstation, a portable computer, a client-server system, or a combination of networked computers, storage media, etc.

A computer-program product includes a medium configured to store or transport computer readable code for a method including:

- determining whether a triggering event correlated with a cache miss for a load instruction occurred; and
- prefetching data for the load instruction following the determining finding that the triggering event occurred.

Finally, a computer system includes a processor and a memory coupled to the processor. The memory has stored therein instructions wherein upon execution of the instructions on the processor, a method comprises:

- determining whether a triggering event correlated with a cache miss for a load instruction occurred; and
- prefetching data for the load instruction following the determining finding that the triggering event occurred.

Thus, occurrences of a load instruction that are likely to miss a cache are dynamically detected using a correlated trigger event. A prefetch is performed for those occurrences when the correlated trigger event occurs. When the correlated trigger event does not occur, a prefetch is not performed for that load instruction. Hence, processor resources are not wasted doing prefetches for dynamic instances of a load instruction that are not likely to miss a cache.

BRIEF DESCRIPTION OF THE DRAWINGS

In the drawings, elements with the same reference numeral are the same or similar elements. Also, the first digit of a reference numeral indicates the figure number in which the element associated with that reference numeral first appears.

DETAILED DESCRIPTION

According to one embodiment of the present invention, a correlated trigger event for a cache miss is used to control whether a prefetch is performed for a correlated load instruction that is anticipated to incur a cache miss. Thus, when a computer program executes, if the correlated trigger event for a cache miss is detected by a check operation 101, a prefetch operation is performed for the correlated load instruction in prefetch operation 102 and processing then continues in continue operation 103. Conversely, if the correlated trigger event does not occur, check operation 101 transfers directly to continue operation 103 and the prefetch is not performed for the correlated load instruction.

Thus, unlike the prior art where a prefetch was executed prior to each time a particular load instruction was expected to be executed, a prefetch is done only if the correlated trigger event occurs prior to execution of the load instruction associated with that correlate trigger event. Consequently, it is possible that for some dynamic instances of that load instruction, a prefetch is performed and for other dynamic instances of the same load instruction, a prefetch is not performed, i.e., if the correlated trigger event occurs the prefetch is performed and otherwise the prefetch is not performed.

Method 100 dynamically predicts whether a load instruction will miss a cache and prefetches data when a cache miss is predicted. Thus, the prefetch is only performed if the trigger event correlated with a cache miss for that load instruction is detected. This selective execution of the prefetches for a particular load instruction results in better processor utilization and performance than the prior art methods that performed a prefetch prior to every execution of a particular load instruction.

Figure 1:
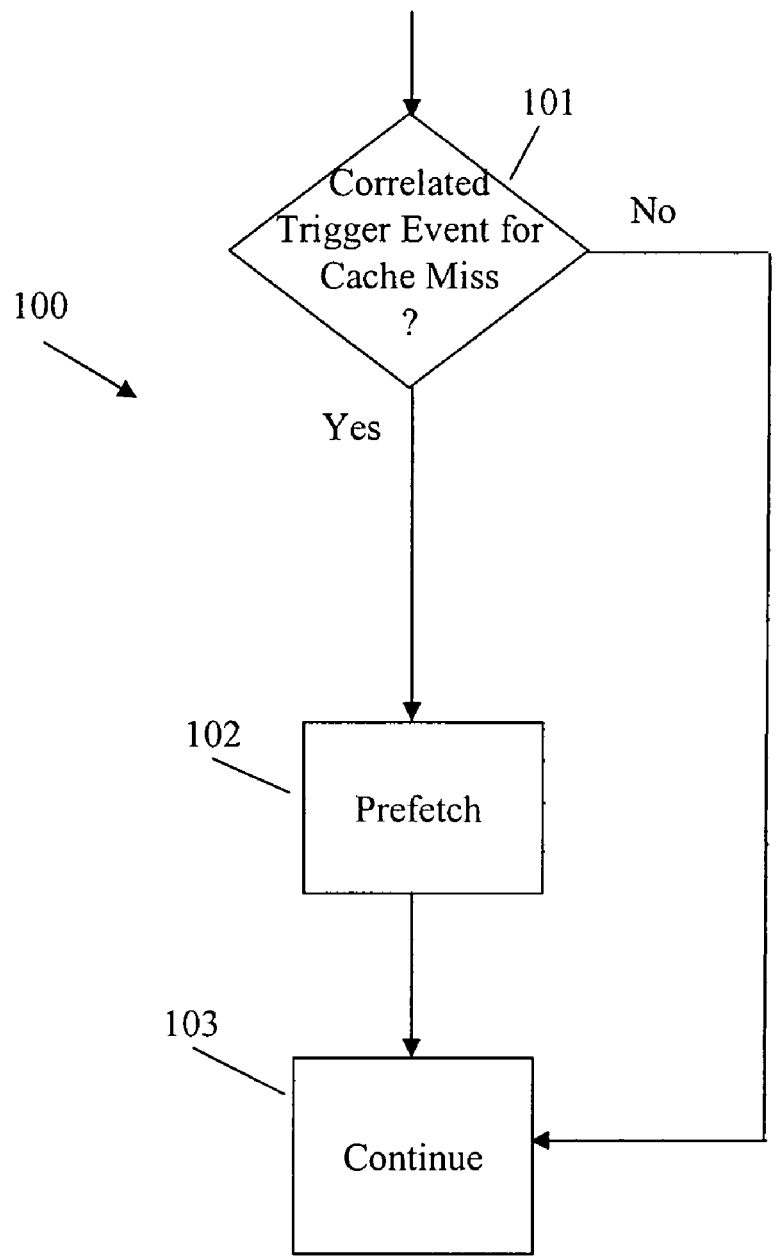
FIG. 1 is a process flow diagram for one embodiment of a method for dynamically determining whether to prefetch data for a load instruction that may miss a cache.
Figure 2:
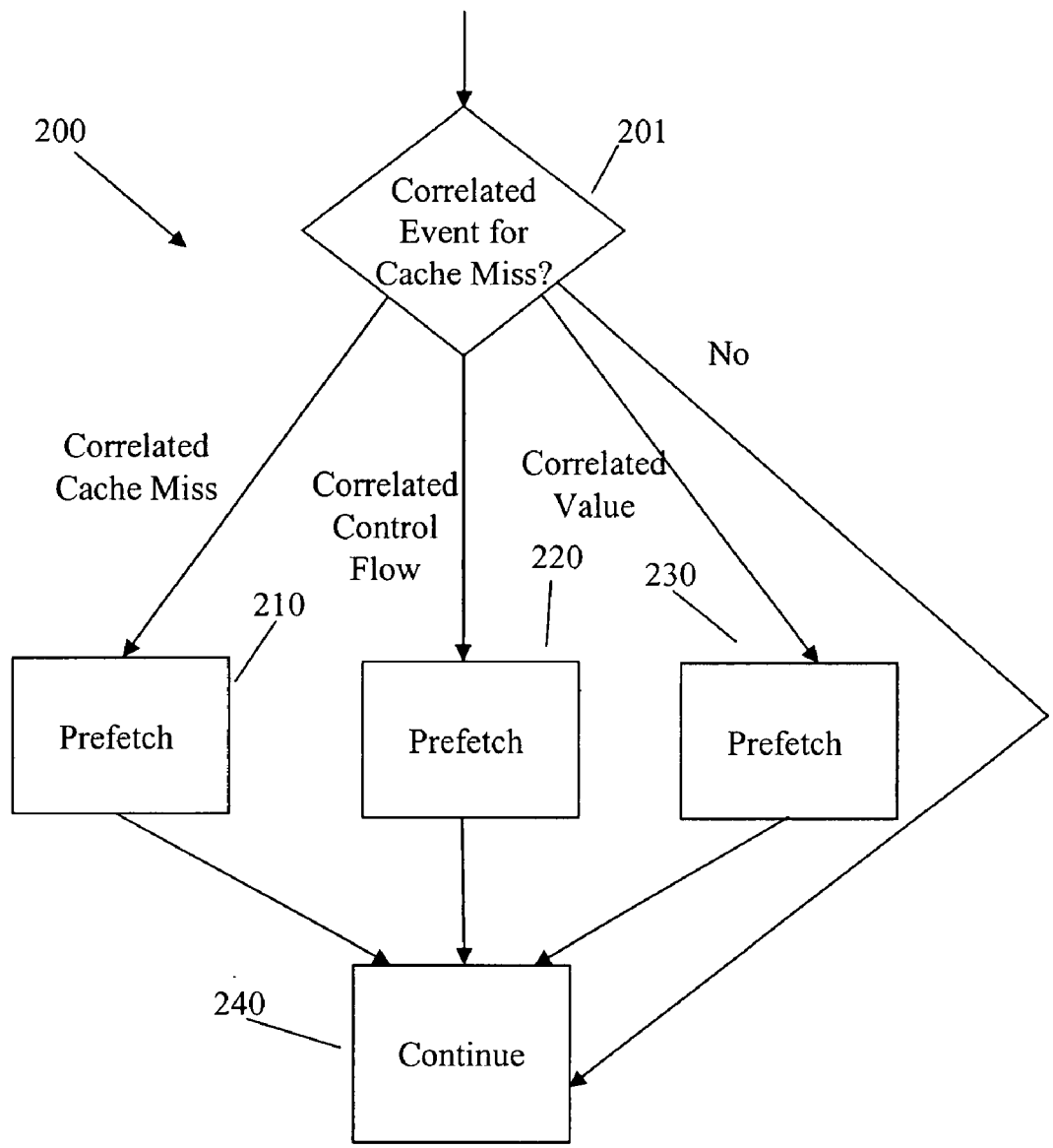
FIG. 2 is a more detailed process flow diagram for one embodiment of a method for dynamically determining whether to prefetch data for a load instruction that may miss a cache using three correlated trigger events.

FIG. 2 is a process flow diagram for a method 200 according to one embodiment of the present invention for three correlated trigger events. In method 200, correlated trigger event for cache miss check operation 201 determines whether a correlated trigger event occurred.

In this example, for convenience, a single check operation 201 is illustrated as checking for one of three correlated trigger events, a correlated cache miss event, a correlated control flow event, and a correlated value event. However, this should not be interpreted as requiring execution of a single code sequence to detect any one of the three correlated trigger events. As explained more completely below, a particular correlated trigger event may be detected by execution of a code sequence that detects only that correlated trigger event.

A correlated cache miss event is associated with execution of a first load instruction that results in a cache miss. A correlation analysis has shown that a cache miss associated with execution of a second load instruction is correlated to the cache miss for the first load instruction.

Hence, when the execution of the first load instruction misses the cache, a correlated cache miss event occurs and correlated event for cache miss check operation 201 transfers to prefetch operation 210. Prefetch operation 210 prefetches data for the second load instruction, which has been correlated with a cache miss associated with execution of the first load instruction. Notice that unlike the prior art, if execution of the first load instruction did not result in a cache miss, prefetch operation 210 is not performed.

A correlated control flow event is a particular control flow sequence that has been correlated with a cache miss for a load instruction that executes after execution of the control flow sequence, i.e., execution of the particular control flow sequence consistently leads to a cache miss for a specific static load instruction. When this particular control flow sequence is executed, a correlated control flow event occurs and correlated event for cache miss check operation 201 transfers to prefetch operation 220.

Prefetch operation 220 prefetches data for the load instruction, which has been correlated with the particular control flow sequence. Again note, that data may not be prefetched for every execution of this load instruction. Data is prefetched for the load instruction when the particular flow control sequence is executed.

A correlated value is the occurrence of a particular value in storage location, e.g., a register or other memory location, when a cache miss by a specific static load follows. When this particular value is detected in the storage location, a correlated value event occurs and correlated event for cache miss check operation 201 transfers to prefetch operation 230. Prefetch operation 230 prefetches data for the load instruction, which has been correlated with the particular stored correlated value. Again note, that data may not be prefetched for every dynamic execution of this load instruction. Data is prefetched for the load instruction when the particular correlated value is stored in the storage location.

In the example of FIG. 2, occurrence of a single correlated trigger event results in execution of scout code in the corresponding prefetch operation. However, this is illustrative only and is not intended to limit the invention to this specific embodiment. In another embodiment, a combination of correlated trigger events for a single set of load instructions are required before a prefetch or prefetches are done for that single set of load instruction. For example, a correlate value event and a correlated control flow event must be detected before a prefetch is done for the correlated load instruction.

Embodiments for each of the three correlated trigger events of FIG. 2 are considered in more detail below. This description is followed by ways to determine the correlated events and a way to modify a computer program to execute scout code when a correlated trigger event occurs is described.

Figure 3:
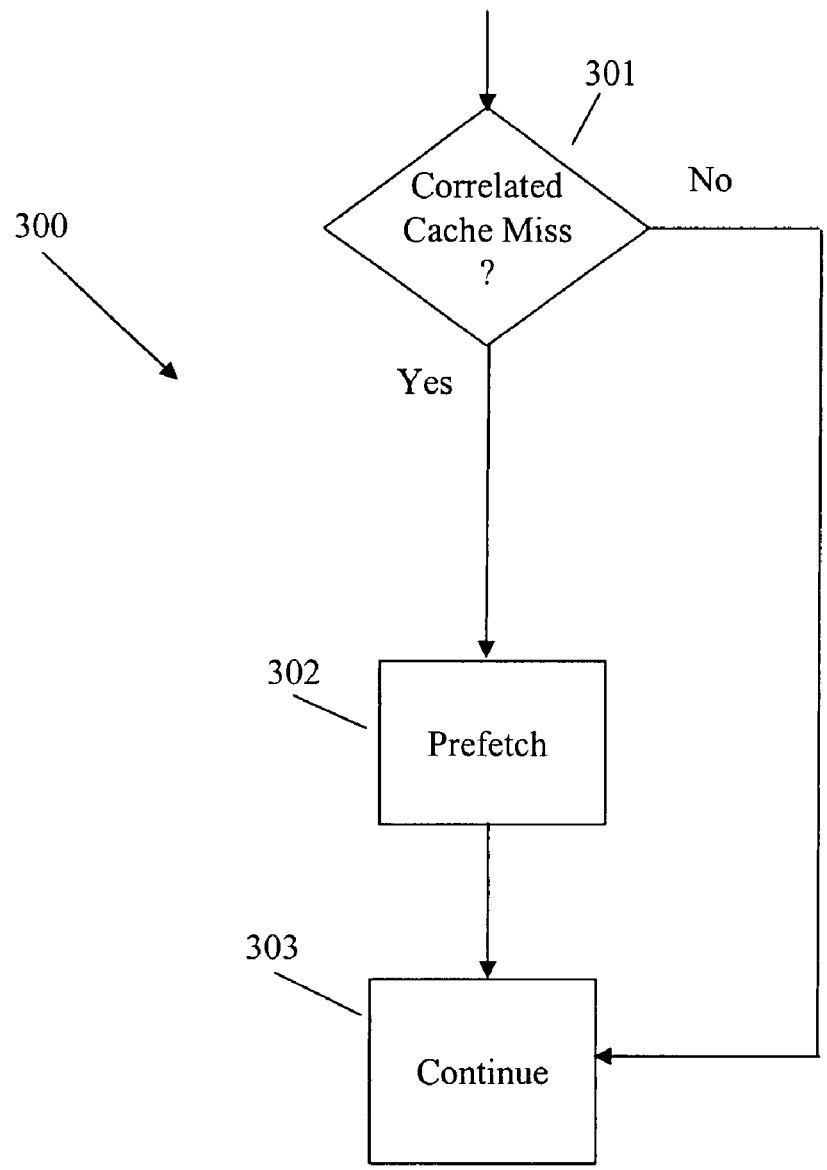
FIG. 3 is a process flow diagram for a method that results from execution of a section of computer code that includes one embodiment of this invention for prefetching data based on a cache miss that is correlated with at least one other cache miss.

FIG. 3 is a process flow diagram for a method 300 that results from execution of a section of computer code that includes one embodiment of this invention. In this embodiment, correlated cache miss check operation 301 determines whether a cache miss has occurred for a first load instruction that has been correlated with a cache miss for at least one subsequent load instruction. If a cache miss occurs for the first load instruction, processing branches to prefetch operation 302 and otherwise to continue operation 303.

In prefetch operation 302, a prefetch is performed for all load instructions that are likely to result in a cache miss and that are correlated with the cache miss for the first load instruction and includes the at least one subsequent load instruction. Upon completion of prefetch operation 302, processing goes to continue operation 303. Thus, when the at least one subsequent load instruction is executed, the cache miss does not occur, because prefetch operation 302 loaded the required data into the cache.

Figure 4A:
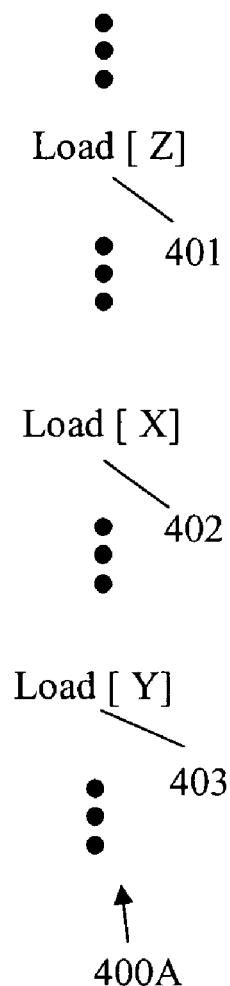
FIG. 4A is an example of a prior art computer pseudo code sequence that includes three load instructions.

FIG. 4A is an example of a prior art computer pseudo code sequence 400A that includes three load instructions 401, 402, and 403. In this example, execution of instruction load[X] 402 and execution of instruction load[Y] 403 are likely to both miss the cache.

In this example, execution of instruction load[Z] 401 is also likely to miss the cache. When execution of instruction load[Z] 401 misses the cache, execution of instruction load[X] 402 and execution of instruction load[Y] 403 also are likely to both miss the cache. Thus, the cache misses for both instruction load[X] 402 and instruction load[Y] 403 are correlated with the cache miss for instruction load[Z] 401.

Figure 4B:
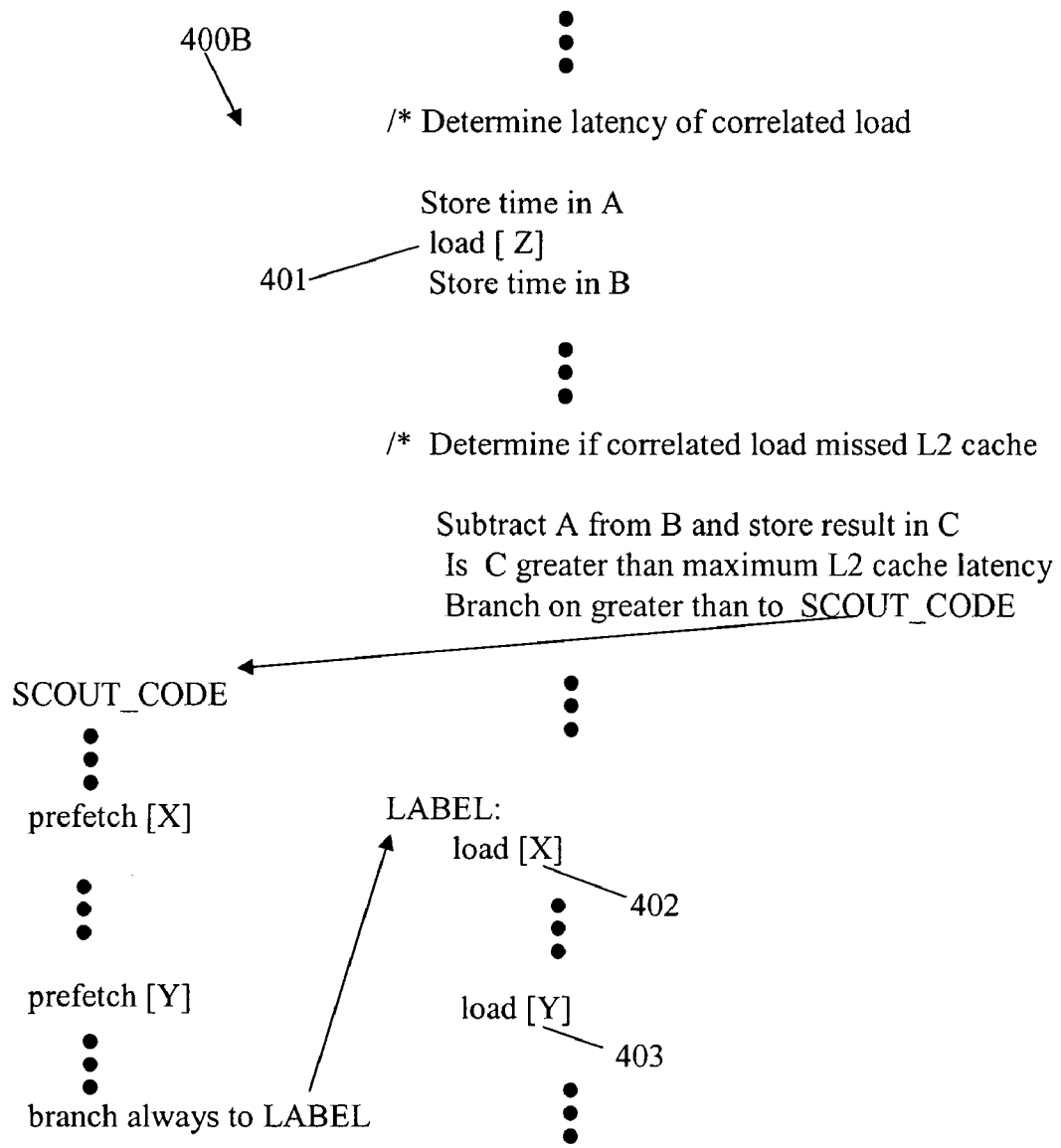
FIG. 4B is one embodiment of a modification of the pseudo code sequence of FIG. 4A that performs the method of FIG. 3.

FIG. 4B is one embodiment of a modified pseudo code segment 400B that performs method 300. In this example, the time required to perform instruction load[Z] 401 is determined by storing a first time just before and a second time just after the execution of instruction load[Z] 401. A time of execution of instruction load[Z] 401 is determined by subtracting the first time from the second time.

The time of execution then is compared with the maximum latency for the cache. If the time of execution is less than or equal to the maximum latency, a cache miss did not occur and processing continues normally without performing a prefetch.

However, if the time of execution is greater than the maximum latency, a cache miss occurred. In this case, processing branches to label SCOUT_CODE and prefetches are performed for both instructions 402 and 403.

Upon completion of the prefetches, processing branches to label LABEL and processing continues. Since the prefetch is performed for multiple load instructions, this embodiment enhances the memory level parallelism.

The mechanism used in the above example to determine whether a cache miss or a cache hit occurred is illustrative only and is not intended to limit the invention to this particular example. Other mechanisms can be used to determine whether a cache miss or cache hit occurred for a particular load instruction. For example, if a processor supports "monitoring load instructions," these instructions can be used to obtain cache hit/miss information.

Figure 4C:
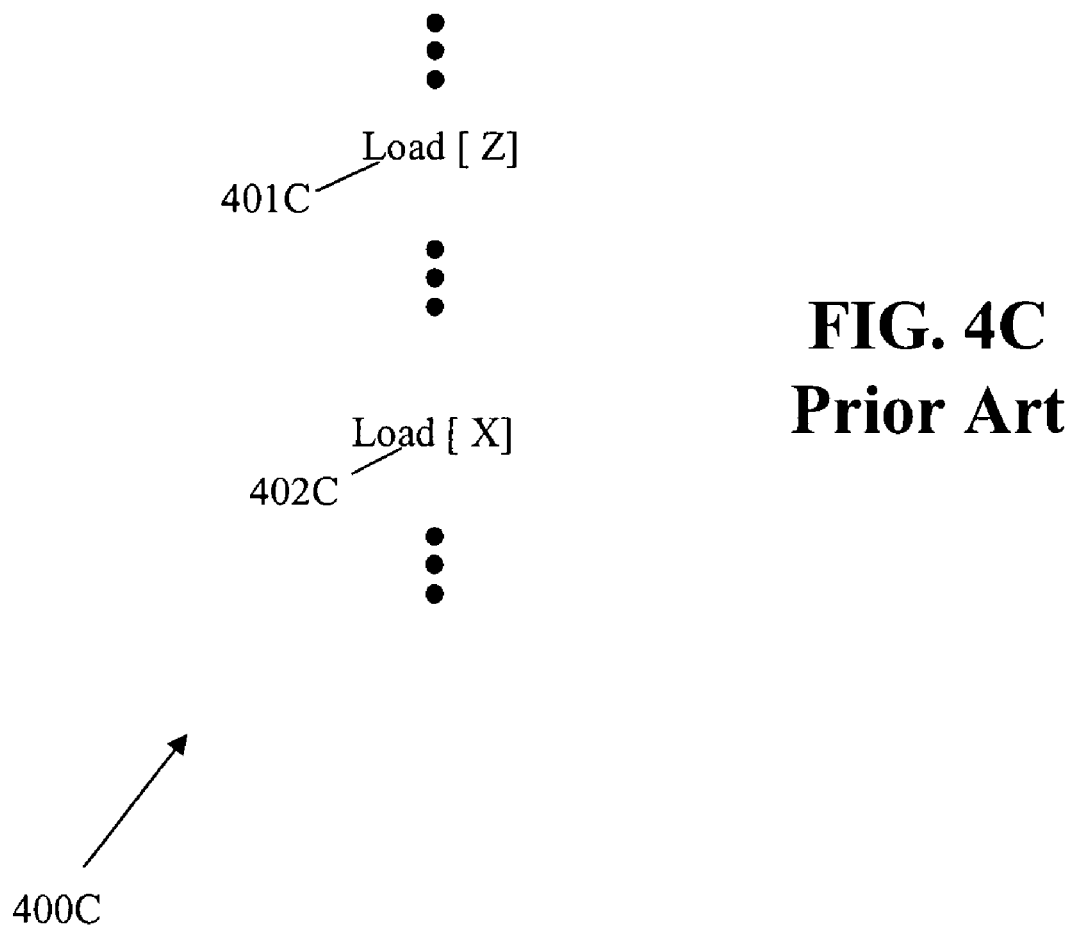
FIG. 4C is an example of a prior art computer pseudo code sequence that includes two load instructions.
Figure 4D:
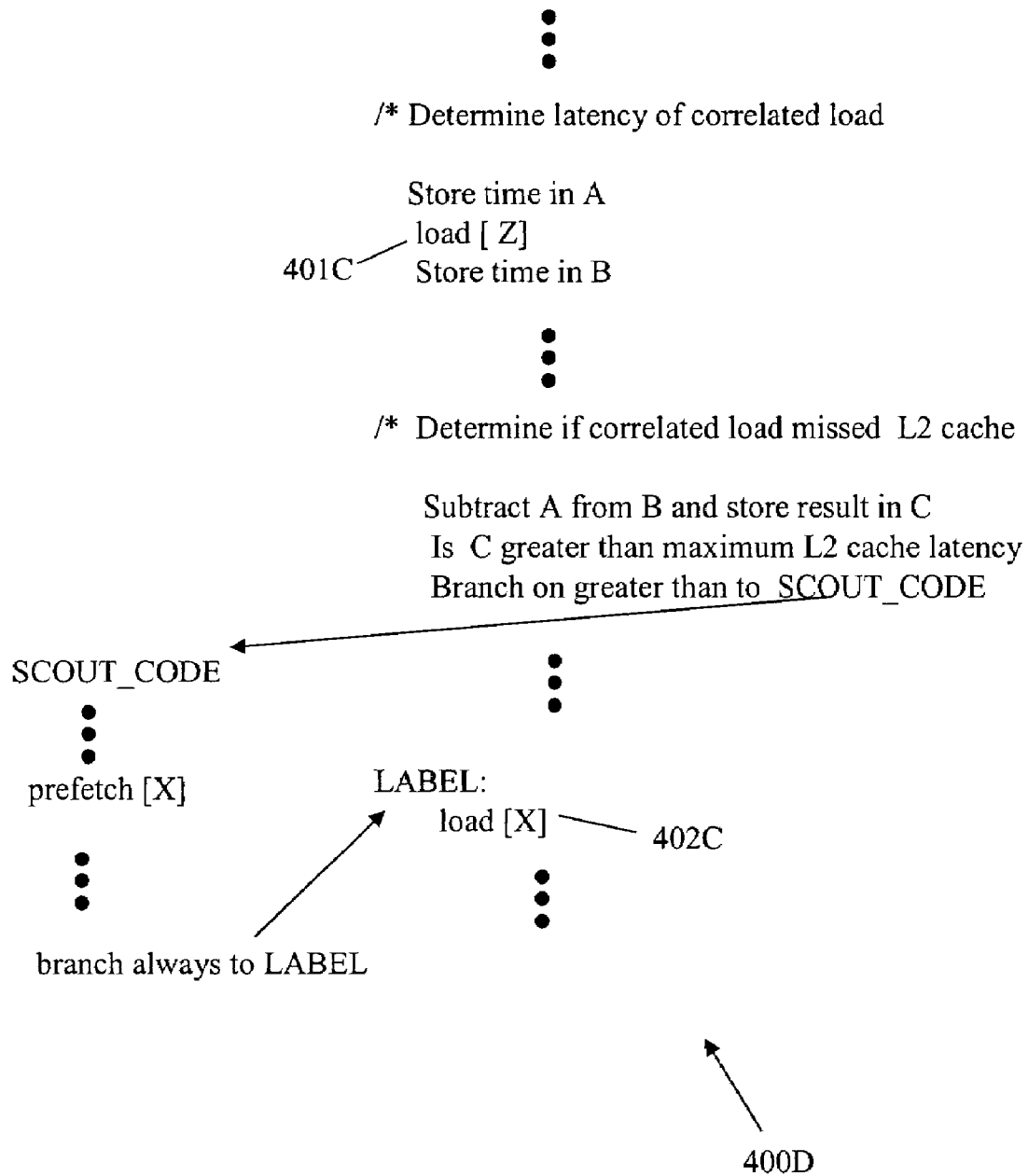
FIG. 4D is one embodiment of a modification of the pseudo code sequence of FIG. 4C that performs the method of FIG. 3.

This embodiment of the invention also is useful if a cache miss for only a single instruction load[X] 402C (FIG. 4C) is correlated with a cache miss for another instruction load[Z] 401C. In the example of FIG. 4D, the memory latency is enhanced by execution of pseudo code segment 400D over the execution of prior pseudo code segment 400C. The operations of code segments 400C and 400D are equivalent to that described for code segments 400A and 400B, respectively and so that description is not repeated herein.

Figure 5:
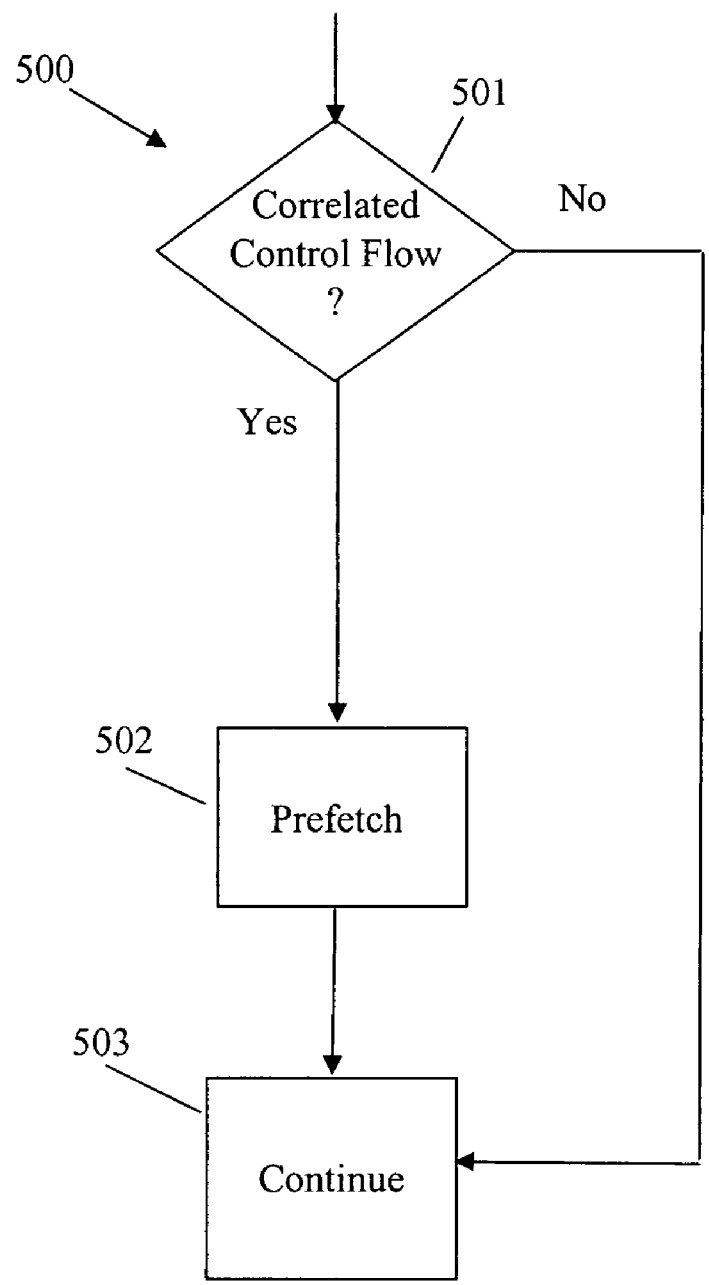
FIG. 5 is a process flow diagram for a method that results from execution of a section of computer code that includes one embodiment of this invention for prefetching data based on execution of a flow control path that is correlated with at least one cache miss.

FIG. 5 is a process flow diagram for a method 500 that results from execution of a section of computer code that includes one embodiment of this invention. In this embodiment, correlated control flow event check operation 501 determines whether a control flow execution path that has been correlated with a cache miss for at least one subsequent load instruction has been executed. If the control flow execution path has been executed, processing branches to prefetch operation 502 and otherwise to continue operation 503.

In prefetch operation 502, a prefetch is performed for all load instructions that are likely to result in cache misses and that are correlated with execution of the control flow execution path and includes the at least one subsequent load instruction. Upon completion of prefetch operation 502, processing goes to continue operation 503. Thus, when the at least one subsequent load instruction is executed, the cache miss does not occur, because prefetch operation 502 loaded the required data into the cache.

Figure 6A:
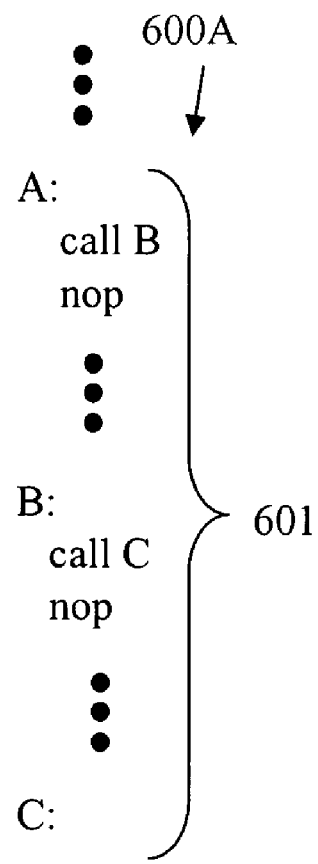
FIG. 6A is an example of a prior art computer pseudo code sequence that includes a flow control path and two load instructions.
Figure 6A:
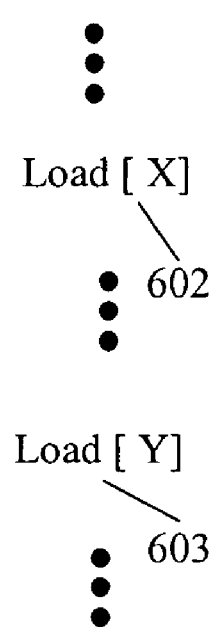

FIG. 6A is an example of a prior art computer pseudo code sequence 600A that includes two load instructions 602 and 603. In this example, a control flow execution path 601 is from label A, to instruction call B, to label B, to instruction call C and then to label C.

When control flow execution path 601 is executed, execution of instruction load[X] 602 and execution of instruction load[Y] 603 are both likely to miss the cache. Thus, the cache misses associated with execution of instruction load[X] 502 and execution of instruction load[Y] 503 are correlated with execution of flow control execution path 601.

Figure 6B:
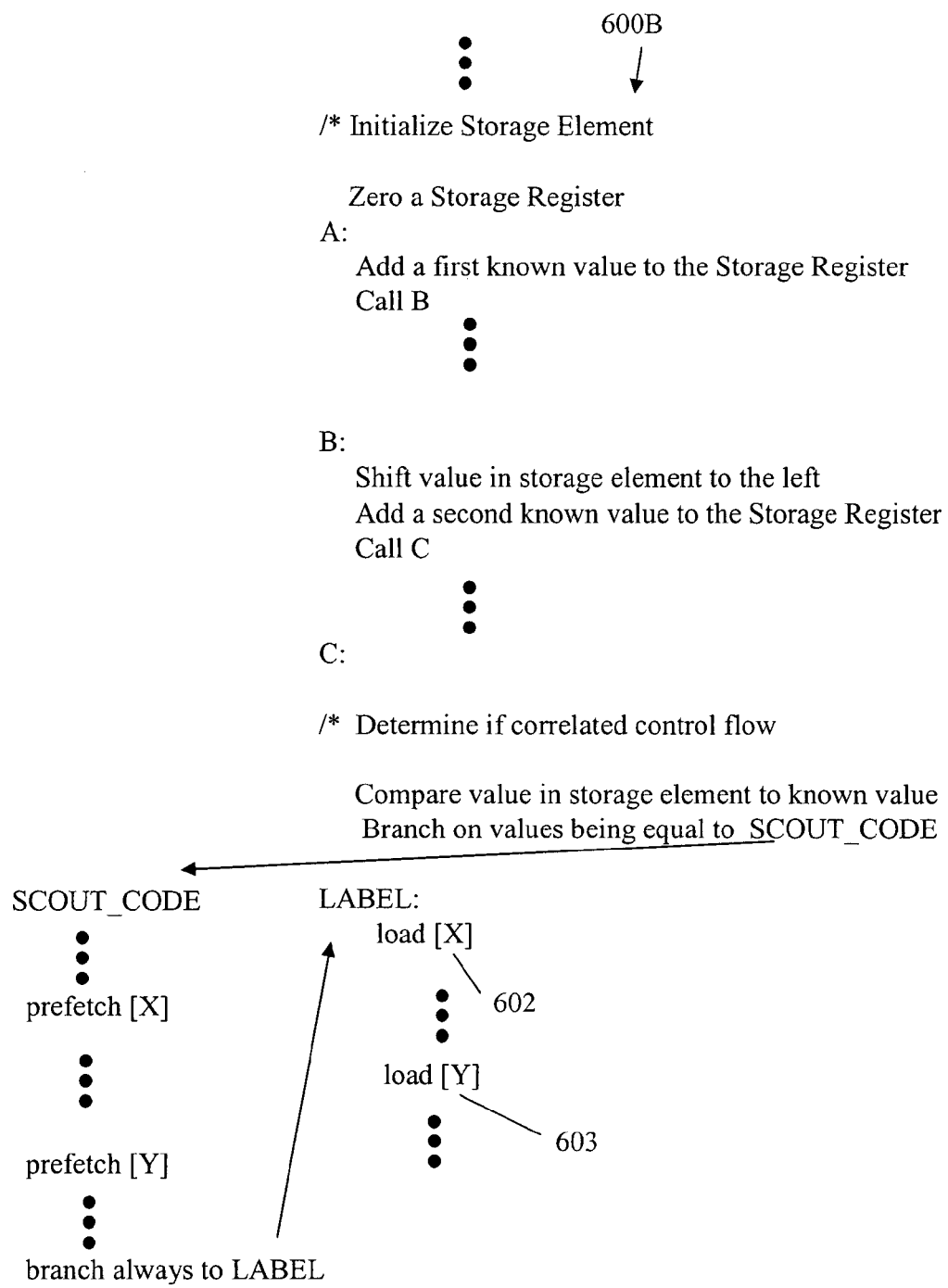
FIG. 6B is one embodiment of a modification of the pseudo code sequence of FIG. 6A that performs the method of FIG. 5.
Figure 6C:
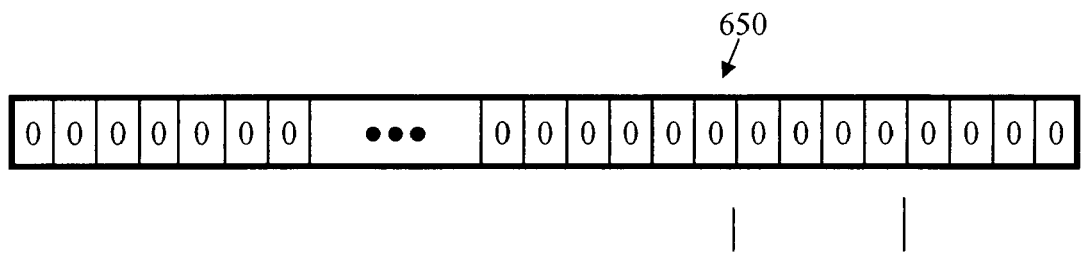
FIGS. 6C to 6F illustrate one embodiment of various states of a register where the value in the register is used in determining whether a correlated flow control path has been executed.
Figure 6D:
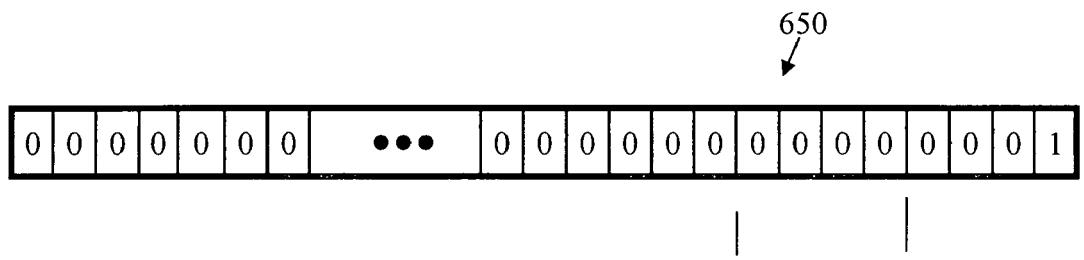

FIG. 6B is one embodiment of a modified pseudo code segment 600B that performs method 500. Prior to the start of the control flow execution path, a storage element is initialized. In this example, storage element 650 (FIG. 6C) is initialized to zero. Following label A, a first known value is added to storage element 650. In FIG. 6D, the first known value is "0001." This value is used to indicate that execution has progressed through label A.

Figure 6E:
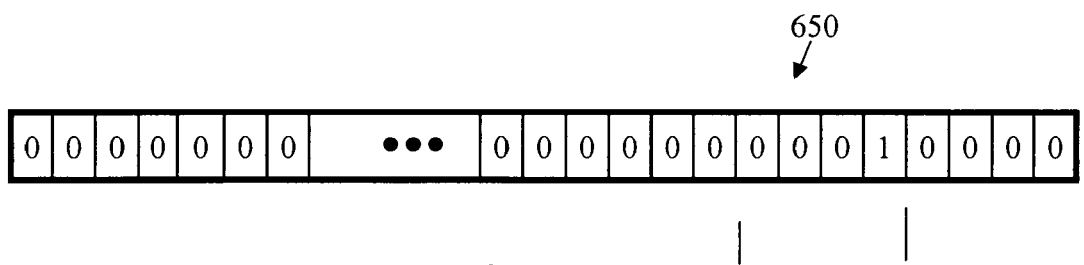
Figure 6F:
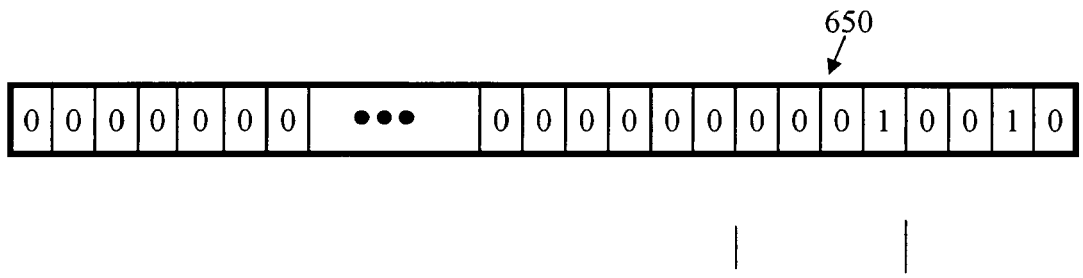

Following label B, the first known value in storage element 650 is shifted to the left a known amount. In this example, four-bit numbers are being used and so first known value "0001" is shifted left four bits to obtain the result illustrated in FIG. 6E. Next, a second known value is added to storage element 650. In FIG. 6F, the second known value is "0010."

Now the value in storage element 650 indicates that execution has progressed through label A and label B. When execution progresses through label C, a determination is make whether execution of the correlated control flow execution path resulted in reaching label C so execution of instruction load[X] 602 and execution of instruction load[Y] 603 are expected to miss the cache.

In this example, the value in storage element 650 is compared with a concatenation of the first and second known values, e.g., "00010010." If the value in storage element 650 equals this value, the correlated control flow execution path has been executed and so execution branches to label SCOUT_CODE and prefetches are performed for both instructions 602 and 603.

Upon completion of the prefetches, processing branches to label LABEL and continues. Since the prefetch is performed for multiple load instructions, this embodiment enhances the memory level parallelism. However, if only a cache miss for a single load instruction were correlated with the control flow execution path, the memory latency would be improved.

The example of FIG. 6B is illustrative only and is not intended to limit the invention to this specific embodiment. In another embodiment, the code segment of FIG. 6A is expanded inline by a compiler as shown by the pseudo code in TABLE 1.

TABLE 1

```
A:
    . . .
B1:
    . . .
C1:
    prefetch [X]
    prefetch [Y]
    . . .
    load [X]
    . . .
    load [Y]
    . . .
B:
    . . .
    call C
    . . .
C:
```

Thus, when the correlated control path is executed, the data is prefetched for the two load instructions that are likely to miss the cache.

Figure 7:
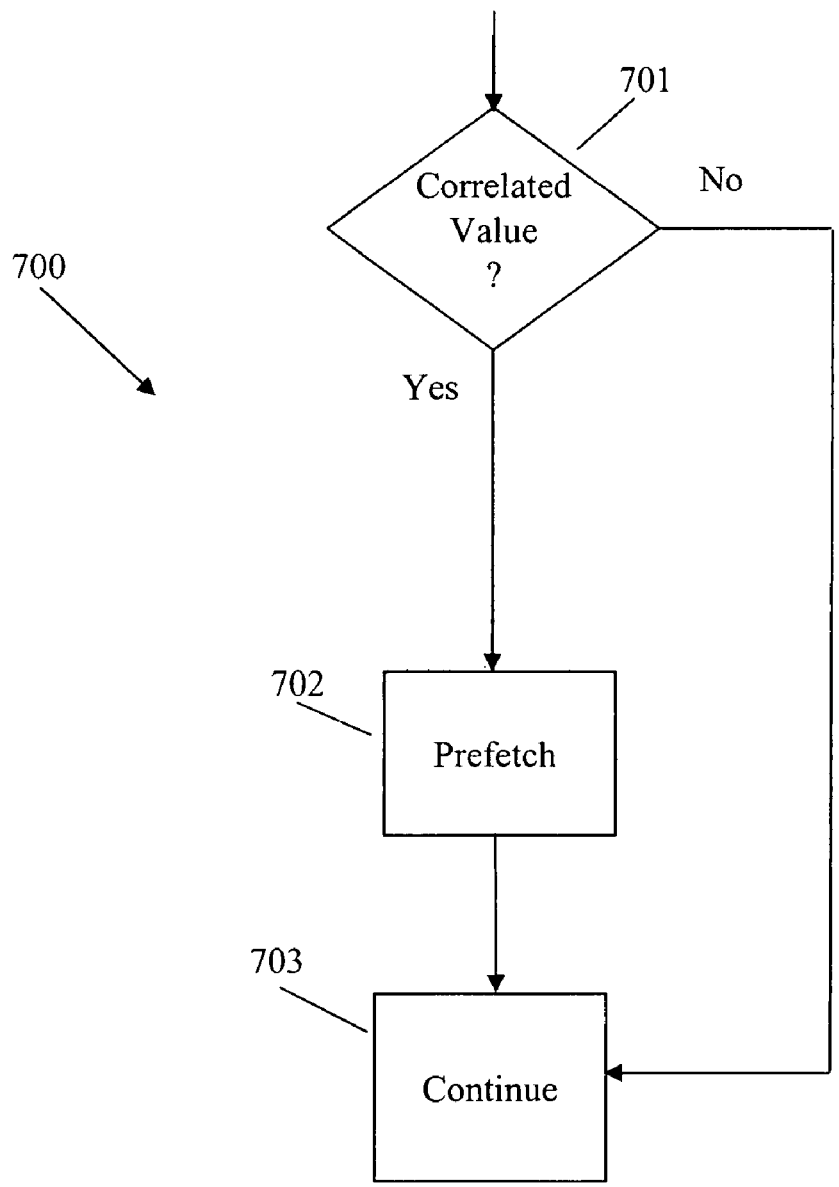
FIG. 7 is a process flow diagram for a method that results from execution of a section of computer code that includes one embodiment of this invention for prefetching data based on a stored value that is correlated with at least one cache miss.

FIG. 7 is a process flow diagram for a method 700 that results from execution of a section of computer code that includes yet another embodiment of this invention. In this embodiment, correlated value check operation 701 determines whether a correlated value is stored in a storage element. The correlated value in the storage element has been correlated with a cache miss for at least one subsequent load instruction. If the correlated value is stored in the storage element, processing branches to prefetch operation 702 and otherwise to continue operation 703.

In prefetch operation 702, a prefetch is performed for all load instructions that are likely to result in cache misses and that are correlated with the correlated value and includes the at least one subsequent load instruction. Upon completion of prefetch operation 702, processing goes to continue operation 703. Thus, when the correlated value is detected in the storage element, the cache miss does not occur, because prefetch operation 702 loaded the required data into the cache.

Figure 8A:
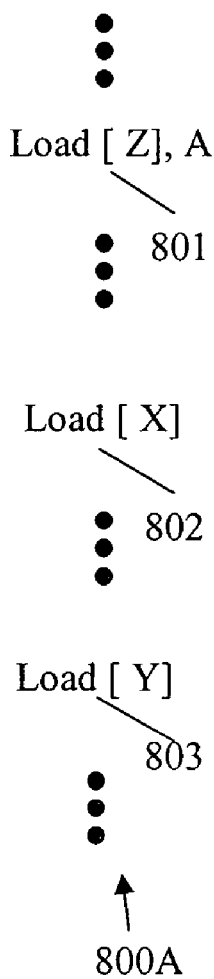
FIG. 8A is an example of a prior art computer pseudo code sequence that includes three load instructions.

FIG. 8A is an example of a prior art computer pseudo code sequence 800A that includes a load instruction 801 that loads a value at address Z into storage element A. This instruction is illustrative only and is not intended to limit this embodiment to a load instruction.

Load instructions 802 and 803 have been determined likely to miss the cache when the value in storage element A is a particular value, e.g., zero. In this example, execution of instruction load[X] 802 and execution of instruction load[Y] 803 are likely to both miss the cache.

In this example, when execution of instruction load[Z] 801 stores a value of zero in storage element A, execution of instruction load[X] 802 and execution of instruction load[Y] 803 are likely to both miss the cache. Thus, the cache misses for both instruction load[X] 802 and instruction load[Y] 403 are correlated with a predefined value being stored in storage element A. The predefined value could be associated with, for example, a compiler phase transition, an initialization, a particular iteration in an iterative process, or perhaps a re-entry point in a re-entrant process.

Figure 8B:
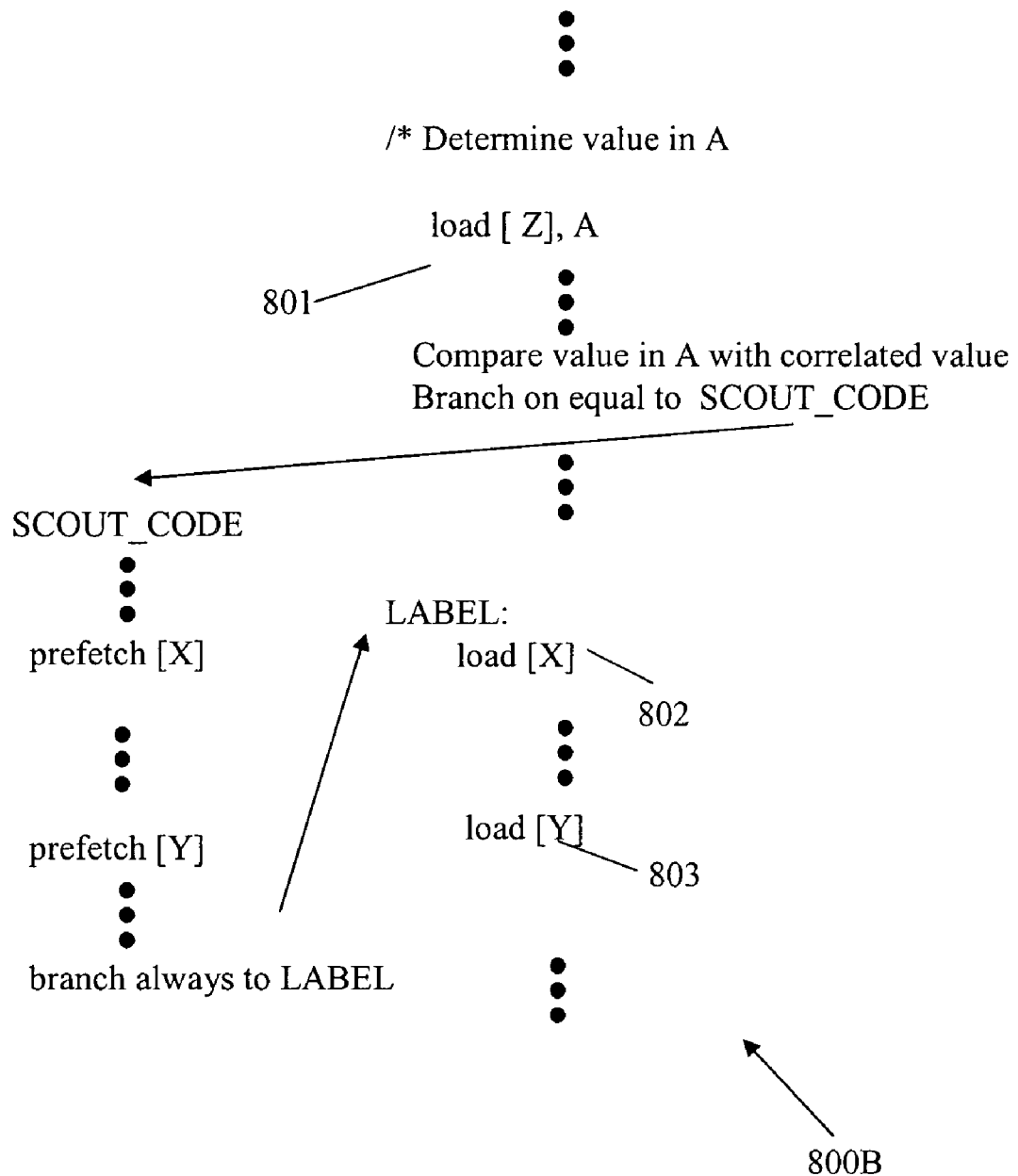
FIG. 8B is one embodiment of a modification of the pseudo code sequence of FIG. 8A that performs the method of FIG. 7.
Figure 9:
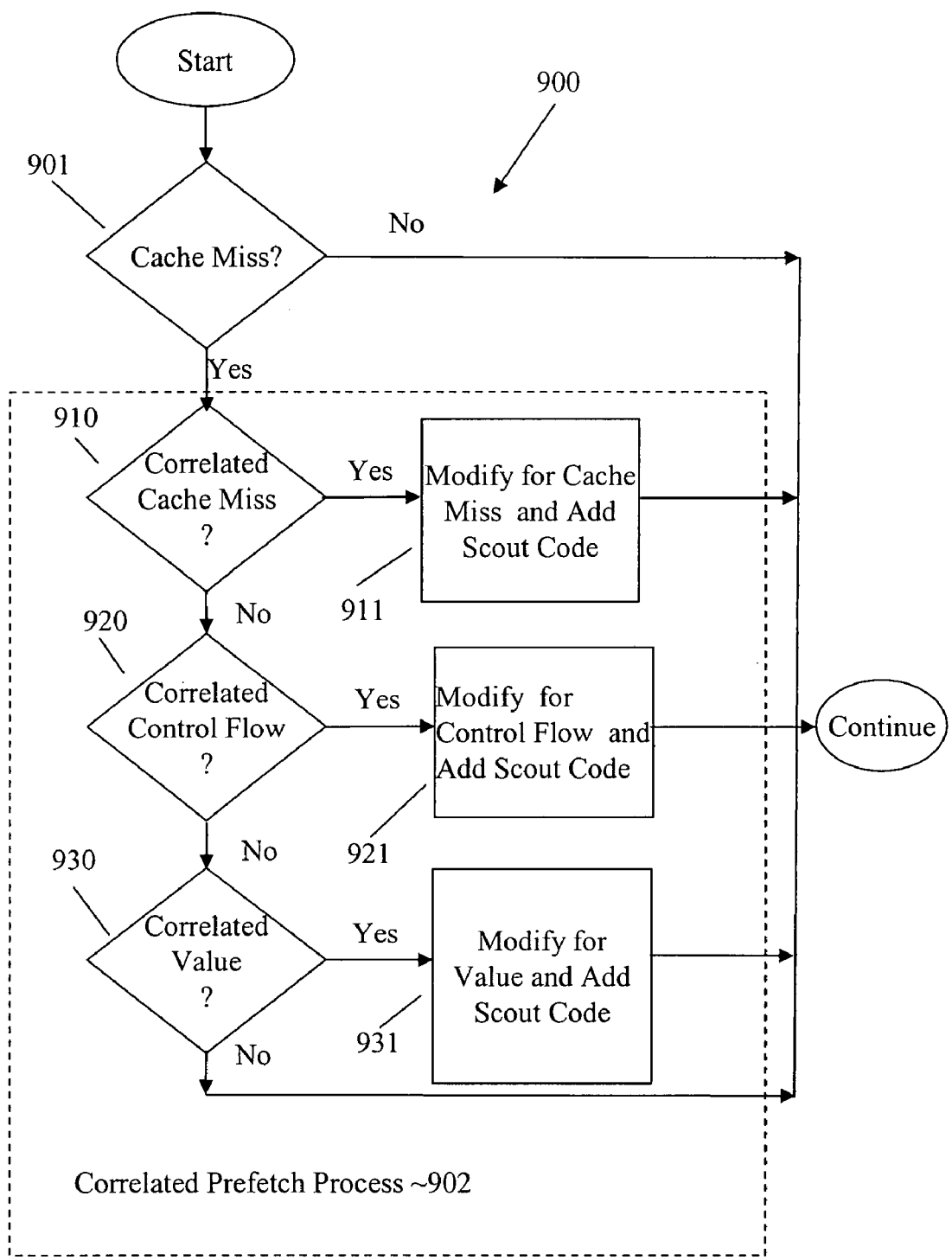
FIG. 9 is a process flow diagram of one embodiment for making a computer program that utilizes the methods of FIGS. 3, 5 and 7.

FIG. 8B is one embodiment of a modified pseudo code segment 800B that performs method 700. In this example, the value in storage element A is compared with a value correlated with the cache misses. If the value in storage element A is not the value correlated with the cache misses, a cache miss is not likely for instructions 802 and 803 and processing continues normally.

However, if the value in storage element A is the value correlated with the cache misses, processing branches to label SCOUT_CODE and prefetches are performed for both instructions 802 and 803. Upon completion of the prefetches, processing branches to label LABEL and processing continues. Since the prefetch is performed for multiple load instructions, this embodiment enhances the memory level parallelism.

This embodiment of the invention also is useful if a cache miss for only a single instruction load[X] is correlated with a predefined value being stored in storage element A. In this embodiment, the memory latency is enhanced over the execution of prior art code segment 800A.

In above examples, three different correlated events are used, a correlated cache miss event, a correlated control flow event, and a correlated value event, as examples of correlated trigger events. These examples are illustrative only and are not intended to limit the invention to these specific correlated trigger events. In view of this disclosure, those of skill in the art can correlate a particular trigger event of interest with a cache miss, and perform prefetches to eliminate the cache miss when that particular trigger event occurs.

While there is some additional overhead associated with the code used to detect the trigger events and the code used for the prefetching, typically this code can be executed during unused issue slots. Thus, the performance of the system is either not degraded or not degraded significantly in view of the processing stalls that are avoided by the prefetching and in view of the fact that prefetching is done when a cache miss is likely.

To discover correlations, a compiler or binary optimizer can analyze execution profiles of a program to determine whether, for example, cache miss correlations, control flow correlations, and/or value correlations exist. The analysis can also determine whether the correlations are significant enough to accurately predict cache misses.

Execution profiles can be collected either statically or dynamically. A static profile is collected by either instrumenting a program or by sampling a processor's hardware performance monitoring event counters while the program is run using representative input data sets.

For example, to detect miss correlations, cache miss profiles can be collected. Some processors write data characterizing the cache miss to a buffer. The cache miss profiles are used to identify memory instructions that miss the cache frequently. The compiler or binary optimizer uses the cache miss profiles to determine which memory instructions, first memory instructions, are correlated with a second memory instruction that misses the cache frequently, i.e., the first memory instructions also miss the cache whenever the second memory instruction misses the cache.

To detect flow control instructions using static profiling, control flow profiles are collected in addition to the cache miss profiles. Some processors write information characterizing a branch operation to a buffer so that the information in the buffer provides control flow profiles. More specifically, control flow profiles are easily collected if a processor's hardware performance monitoring facility provides a branch history register that records the last several branches executed. This register is read whenever there is a cache miss by a memory instruction that misses the cache frequently. Correlation techniques are used to determine whether information in the branch history correlates with the memory instruction that misses the cache frequently.

To detect value correlations using static profiling, the values in one or more of the processor's registers are read whenever there is a cache miss by a memory instruction that misses the cache frequently. These register values are used to identify correlations between certain register values and cache misses.

Dynamic profiling is similar to static profiling except the profiles are collected on the fly while the program is actually running. The profiles collected are used in a similar manner as the profiles collected using static profiling to identify different types of correlations. Dynamic profiling is especially appropriate for dynamic binary optimizers.

Since the compiler or optimizing interpreter may not know conclusively whether a particular instruction will have a long latency on a given execution, the ability to develop a correlation to predict when the instruction will experience a long latency assures that a prefetch is executed when a particular instruction is likely to encounter the long latency. Thus, as described above, scout code is inserted at points where long latency is expected, but if the correlated trigger event does not occur, the code continues without execution of the scout code.

More specifically, in one embodiment, process 900 is used to modify program code to check for a correlated trigger event and to insert scout code at selected locations. In cache miss check operation 901, a determination is made whether during the static or dynamic profiling a cache miss occurred and whether sufficient data is available to perform a correlation analysis. If the determination in cache miss check operation 901 is true, processing transfers to correlated prefetch process 902 and otherwise processing continues.

In correlated cache miss check operation 910, any cache miss profiles are analyzed to determine whether there is a relationship for the current cache miss with cache misses in the cache miss profiles. If there is such a relationship and the correlation is significant, processing transfers to modify for cache miss and add scout code operation 911 and otherwise transfers to correlated control flow check operation 920.

In modify for cache miss and add scout code operation 911, computer code for check operation 301 is inserted in the computer program at the appropriate points as is the scout code that performs prefetch operation 302. See FIGS. 4A to 4D, for example.

In correlated control flow check operation 920, any control flow profiles are analyzed to determine whether there is a relationship for the current cache miss with the control flow execution paths in the control flow profiles. If there is such a relationship and the correlation is significant, processing transfers to modify for control flow and add scout code operation 921 and otherwise transfers to correlated value check operation 930.

In modify for control flow and add scout code operation 921, computer code for check operation 501 is inserted in the computer program at the appropriate points as is the scout code that performs prefetch operation 502. See FIGS. 6A to 6F, for example.

In correlated value check operation 930, any register profiles are analyzed to determine whether there is a relationship for the current cache miss with a value in one or more of the registers. If there is such a relationship and the correlation is significant, processing transfers to modify for value and add scout code operation 931 and otherwise transfers to continue.

In modify for value and add scout code operation 931, computer code for check operation 701 is inserted in the computer program at the appropriate points as is the scout code that performs prefetch operation 702. See FIGS. 8A to 8B, for example.

Herein, when it is stated that an instruction takes an action or uses information, those of skill in the art understand that such action or use is the result of execution of that instruction.

Those skilled in the art readily recognize that in this embodiment the individual operations mentioned before in connection with any of method 100, method 200, method 300, method 500, method 700 and method 900, for example, are performed by executing computer program instructions on a processor 1070 of computer system 1000. In one embodiment, a storage medium has thereon installed computer-readable program code for method 1040 where method 1040 includes any one of method 100, method 200 method 300, method 500, method 700 and method 900 or any combination of these methods, and execution of the computer-readable program code causes processor 1070 to perform the individual operations of the corresponding method as explained above.

In one embodiment, computer system 1000 is a hardware configuration like a personal computer or workstation. However, in another embodiment, computer system 1000 is part of a client-server computer system 1050. For either a client-server computer system 1050 or a stand-alone computer system 1000, memory typically includes both volatile-memory, such as main memory 1022, and non-volatile memory 1021, such as hard disk drives.

Figure 10:
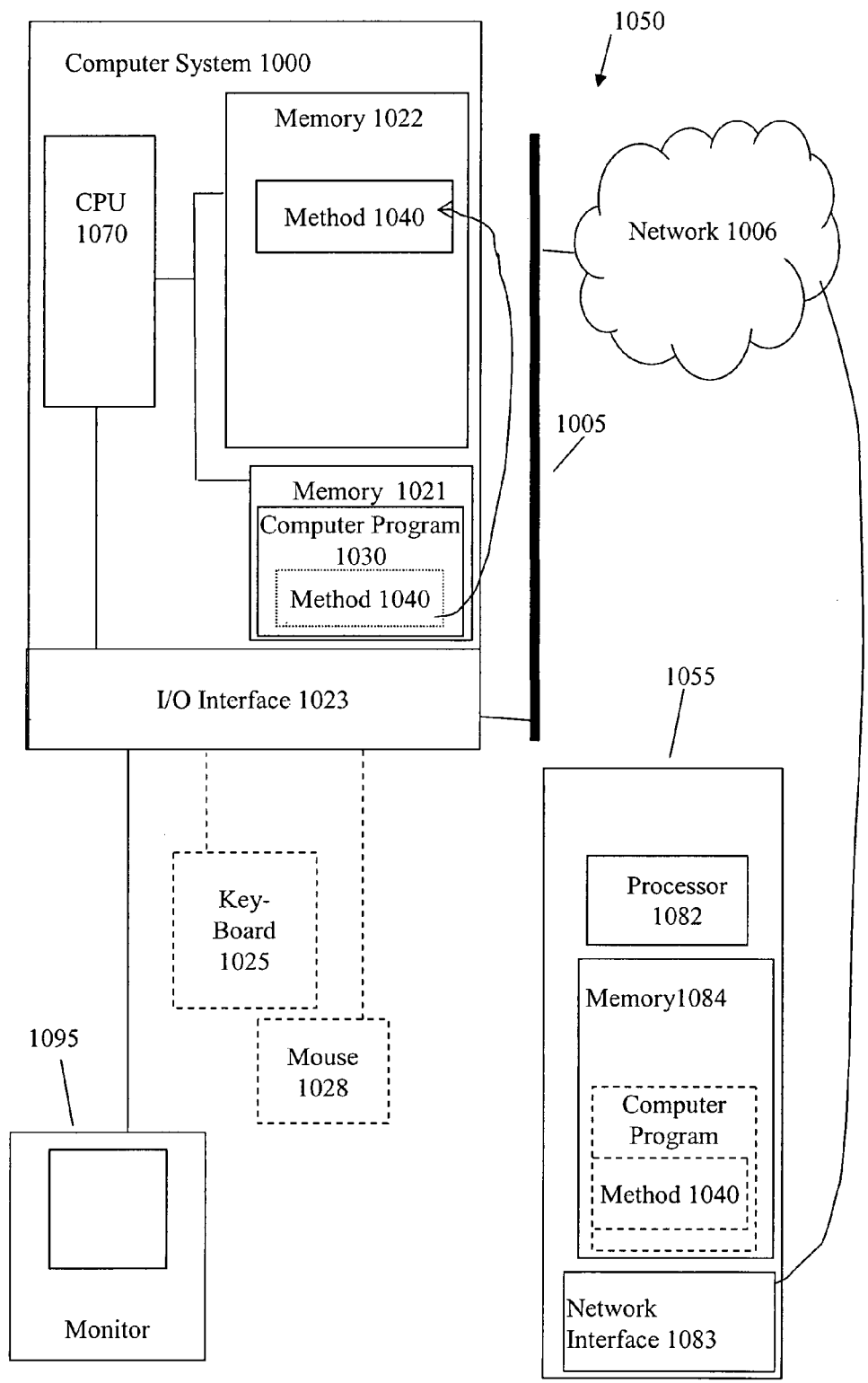
FIG. 10 is a block diagram of one embodiment of a system that includes a source program including code sequences for any one or any combination of the methods of FIGS. 1, 2, 3, 5, and 7.

While memory 1022 and memory 1021 are illustrated as unified structures in FIG. 10, this should not be interpreted as requiring that all memory be at the same physical location. All or part of this memory can be in a different physical location than processor 1070. For example, method 1040 may be stored in memory, e.g., memory 1084, which is physically located in a location different from processor 1070.

Processor 1070 should be coupled to the memory containing method 1040, e.g., by networks 1006 and 1005. This could be accomplished in a client-server system, or alternatively via a connection to another computer via modems and analog lines, or digital interfaces and a digital carrier line. For example, all of part of memory 1021 could be in a World Wide Web portal, while processor 1070 is in a personal computer, for example.

More specifically, computer system 1000, in one embodiment, can be a portable computer, a workstation, a server computer, or any other device that can execute method 1040. Similarly, in another embodiment, computer system 1000 can be comprised of multiple different computers, wireless devices, server computers, or any desired combination of these devices that are interconnected to perform method 1040, as described herein.

Herein, a computer program product comprises a medium configured to store or transport computer readable code for method 1040 or in which computer readable code for method 1040 is embodied. Some examples of computer program products are CD-ROM discs, ROM cards, floppy discs, magnetic tapes, computer hard drives, servers on a network and signals transmitted over a network representing computer readable program code.

Herein, a computer memory refers to a volatile memory, a non-volatile memory, or a combination of the two. Similarly, a computer input unit, e.g., keyboard 1025 and mouse 1028, and a display unit 1095 refer to the features providing the required functionality to input the information described herein, and to display the information described herein, respectively, in any one of the aforementioned or equivalent devices.

In view of this disclosure, method 1040 can be implemented in a wide variety of computer system configurations using an operating system and computer programming language of interest to the user. In addition, method 1040 could be stored as different modules in memories of different devices. For example, method 1040 could initially be stored in a server computer 1055, and then as necessary, a module of method 1040 could be transferred to a client device and executed on the client device. Consequently, part of method 1040 would be executed on server processor 1082, and another part of method 1040 would be executed on the processor of the client device.

In yet another embodiment, method 1040 is stored in a memory of another computer system. Stored method 1040 is transferred over a network 1005, 1006 to memory 1021 in system 1000. The transfer utilizes I/O interface 1023 and I/O interface 1083.

Method 1040 is implemented, in one embodiment, in a computer source program 1030. The computer program may be stored on any common data carrier like, for example, a floppy disk or a compact disc (CD), as well as on any common computer system's storage facilities like hard disks. Therefore, one embodiment of the present invention also relates to a data carrier for storing a computer source program for carrying out the inventive method. Another embodiment of the present invention also relates to a method for using a computer system for carrying out method 1040. Still another embodiment of the present invention relates to a computer system with a storage medium on which a computer program for carrying out method 1040 is stored.

While method 1040 hereinbefore has been explained in connection with one embodiment thereof, those skilled in the art will readily recognize that modifications can be made to this embodiment without departing from the spirit and scope of the present invention.

We claim:

1. A computer-based method comprising:

determining, by executing a sequence of program instructions of a computer program on a processor during execution of said computer program, whether a triggering event, correlated with a cache miss for a load instruction occurred, wherein said determining by executing a sequence of program instructions comprises:

generating a first value by executing instructions in said sequence of program instructions wherein said first value is based on characteristics associated with said triggering event;

comparing said first value with a known value to determine whether a predetermined relationship exists between said first value and said known value; and indicating said triggering event occurred when said comparing finds a predetermined relationship between said first value and said known value and otherwise indicating said triggering event did not occur;

prefetching, by executing a scout code sequence of program instructions on said processor, data for the load instruction following the determining finding that the triggering event occurred; and continuing without prefetching data for the load instruction following the determining finding that the triggering event had not occurred, wherein said triggering event comprises at least one of a correlated cache miss event and a correlated control flow event;

further wherein for said correlated cache miss event, said cache miss for a load instruction is correlated with a cache miss for another load instruction different from said load instruction, wherein said generating a first value comprises:

determining a latency of said load instruction; and also wherein, said known value comprises a maximum latency of a cache; and said predetermined relationship is said latency being greater than said maximum latency; and still further wherein for said correlated control flow event, said sequence of program instructions includes a control flow sequence of instructions executed before said load instruction; and said cache miss for said load instruction is correlated with execution of said control flow sequence of instructions, wherein said generating a first value comprises:

initializing a storage element to a known value prior to start of execution of said control flow sequence;

adding a first known value to said storage element in a first portion of said control flow sequence;

shifting said value in said storage element in a predetermined direction and adding a second known value to said storage element in a second portion of said control flow sequence different from said first portion; and also wherein said known value comprises a concatenation of the first and second known values; and said predetermined relationship is a value in said storage element equaling said concatenation of the first and second known values.

2. The computer-based method of claim 1 wherein the triggering event is the correlated control flow event and a correlated value event wherein said cache miss for said load instruction is correlated with a value in a storage element different from said cache, and further wherein said generating a first value comprises:

loading said value in a register and also wherein said known value comprises a correlated value in said register wherein said correlated values is correlated with said cache miss; and said predetermined relationship is said value equals said correlated value.

3. A structure comprising:

means for determining, by executing a sequence of program instructions of a computer program on a processor during execution of said computer program, whether a triggering event, correlated with a cache miss for a load instruction occurred, wherein said means for determining by executing a sequence of program instructions comprises:

means for generating a first value by executing instructions in said sequence of program instructions wherein said first value is based on characteristics associated with said triggering event;

means for comparing said first value with a known value to determine whether a predetermined relationship exists between said first value and said known value; and means for indicating said triggering event occurred when said comparing finds a predetermined relationship between said first value and said known value and otherwise indicating said triggering event did not occur;

means for prefetching, by executing a scout code sequence of program instructions on said processor, data for the load instruction following the determining finding that the triggering event occurred; and means for continuing without prefetching data for the load instruction following the determining finding that the triggering event had not occurred, wherein said triggering event comprises at least one of a correlated cache miss event and a correlated control flow event;

further wherein for said correlated cache miss event, said cache miss for a load instruction is correlated with a cache miss for another load instruction different from said load instruction, wherein said means for generating a first value comprises:

determining a latency of said load instruction; and also wherein, said known value comprises a maximum latency of a cache; and said predetermined relationship is said latency being greater than said maximum latency; and still further wherein for said correlated control flow event, said sequence of program instructions includes a control flow sequence of instructions executed before said load instruction; and said cache miss for said load instruction is correlated with execution of said control flow sequence of instructions, wherein said means for generating a first value comprises:

initializing a storage element to a known value prior to start of execution of said control flow sequence;

adding a first known value to said storage element in a first portion of said control flow sequence;

shifting said value in said storage element in a predetermined direction and adding a second known value to said storage element in a second portion of said control flow sequence different from said first portion; and also wherein said known value comprises a concatenation of the first and second known values; and said predetermined relationship is a value in said storage element equaling said concatenation of the first and second known values.

4. The structure of claim 3 wherein the triggering event is the correlated control flow event and a correlated value event wherein said cache miss for said load instruction is correlated with a value in a storage element and further wherein said generating a first value comprises:

loading said value in a register and also wherein said known value comprises a correlated value in said register wherein said correlated values is correlated with said cache miss; and said predetermined relationship is said value equals said correlated value.

5. A computer-program product comprising a computer storage medium configured to store or transport computer readable code for a method comprising:

determining, by executing a sequence of program instructions of a computer program on a processor during execution of said computer program, whether a triggering event, correlated with a cache miss for a load instruction occurred, wherein said determining by executing a sequence of program instructions comprises:

generating a first value by executing instructions in said sequence of program instructions wherein said first value is based on characteristics associated with said triggering event;

comparing said first value with a known value to determine whether a predetermined relationship exists between said first value and said known value; and indicating said triggering event occurred when said comparing finds a predetermined relationship between said first value and said known value and otherwise indicating said triggering event did not occur;

prefetching, by executing a scout code sequence of program instructions on said processor, data for the load instruction following the determining finding that the triggering event occurred; and continuing without prefetching data for the load instruction following the determining finding that the triggering event had not occurred, wherein a control flow sequence of instructions is executed before said load instruction and the triggering event comprises a correlated control flow event wherein said cache miss for said load instruction is correlated with execution of said control flow sequence of instructions and further wherein said means for generating a first value comprises:

initializing a storage element to a known value prior to start of execution of said control flow sequence;

adding a first known value to said storage element in a first portion of said control flow sequence;

shifting said value in said storage element in a predetermined direction and adding a second known value to said storage element in a second portion of said control flow sequence different from said first portion; and also wherein said known value comprises a concatenation of the first and second known values; and said predetermined relationship is a value in said storage element equaling said concatenation of the first and second known values.

6. A computer system comprising:

a processor; and a memory coupled to the processor and having stored therein instructions wherein upon execution of the instructions on the processor, a method is performed comprising:

determining, by executing a sequence of program instructions of a computer program on said processor during execution of said computer program, whether a triggering event, correlated with a cache miss for a load instruction occurred, wherein said determining by executing a sequence of program instructions comprises:

generating a first value by executing instructions in said sequence of program instructions wherein said first value is based on characteristics associated with said triggering event;

comparing said first value with a known value to determine whether a predetermined relationship exists between said first value and said known value; and indicating said triggering event occurred when said comparing finds a predetermined relationship between said first value and said known value and otherwise indicating said triggering event did not occur;

prefetching, by executing a scout code sequence of said instructions on said processor, data for the load instruction following the determining finding that the triggering event occurred; and continuing without prefetching data for the load instruction following the determining finding that the triggering event had not occurred,
  wherein the triggering event comprises a correlated cache miss event wherein said cache miss for a load instruction is correlated with a cache miss for another load instruction different from said load instruction and further wherein said means for generating a first value comprises:

determining a latency of said load instruction; and also wherein,
  said known value comprises a maximum latency of a cache; and
said predetermined relationship is said latency being greater than said maximum latency.

* * * * *